United States Patent [19]

Smith

[11] Patent Number: 4,766,926

[45] Date of Patent: Aug. 30, 1988

[54] HYDRAULIC UNLOADING VALVES

[75] Inventor: Derek J. Smith, Sutton Coldfield, United Kingdom

[73] Assignee: Massey-Ferguson Services N.V., Curacao, Netherlands Antilles

[21] Appl. No.: 97,568

[22] Filed: Sep. 16, 1987

[30] Foreign Application Priority Data

Oct. 1, 1986 [GB] United Kingdom ................. 8623556

[51] Int. Cl.[4] ................................................ G05D 7/01

[52] U.S. Cl. .................................... 137/115; 137/468; 137/501

[58] Field of Search ......................... 137/468, 501, 115

[56] References Cited

U.S. PATENT DOCUMENTS 4,440,192 4/1984 Doennelly ...................... 137/468 X 4,557,287 12/1985 Laufer ............................ 137/468 X

*Primary Examiner*—Alan Cohan

[57] ABSTRACT

An hydraulic unloading valve for unloading hydraulic fluid from a circuit pressurized by a diesel engine powered pump under cold climate conditions to assist starting of the engine. The valve has an inlet through which fluid enters the valve, an outlet through which fluid may leave the valve, an outlet valve seat, a valve member movable towards and away from the valve seat and carrying a valve surface for closing off the seat valve, a first orifice sensitive to viscosity which in response to the flow of fluid through the inlet generates a first pressure drop arranged to tend to move the valve member away from the valve seat, and second orifice which is not sensitive to viscosity and which in response to said flow generates a second pressure drop arranged to tend to move the valve towards the valve seat to bring the valve seat and surface into contact to close-off through the valve outlet when the second pressure drop is greater than the first pressure drop. The pressure drop characteristics of the two orifices can be arranged so that at lower fluid temperatures of say below −10 degrees C. the valve is held open up to higher fluid flow rates, thus relieving load on the engine and assisting cold starting.

7 Claims, 3 Drawing Sheets

HYDRAULIC UNLOADING VALVES

This invention relates to hydraulic unloading valves, that is, for example, valves designed to unload hydraulic fluid from a circuit under certain conditions in order to relieve the load on the circuit pump and its associated prime mover.

It is well established, for example, that it is desirable during the starting of an internal combustion engine to relieve the engine of additional loads, such as incurred by the driving of hydraulic pumps, in order to assist cranking of the engine by the starter and the establishment of the engine in a running condition.

It will be appreciated that the load imposed on an engine during start-up is significantly higher when the hydraulic fluid is cold and thus more viscous.

It is an object of the present invention to provide an unloading valve which closes to apply an associated hydraulic load at different inlet flow rates dependent on the temperature of the fluid.

Thus according to the present invention there is provided a hydraulic unloading valve having an inlet through which fluid enters the valve, an outlet through which fluid may leave the valve, an outlet valve seat, a valve member movable towards and away from the valve seat and carrying a valve surface for closing off the valve seat, a first orifice means sensitive to viscosity which in response to the flow of fluid through the inlet generates a first pressure drop arranged to tend to move the valve member away from the valve seat, and second orifice means which is not sensitive to viscosity and which in response to said flow generates a second pressure drop arranged to tend to move the valve toward the valve seat to bring the valve seat and surface into contact to close-off flow through the valve outlet when the second pressure drop is greater than the first pressure drop.

In a preferred construction the first orifice means comprises one or more passages whose dimensions ensure substantially laminar flow of fluid therethrough and the second orifice means comprises one or more sharp edged orifices.

A light spring is preferably provided to ensure that the valve seat is opened when there is no inlet flow.

It will be appreciated that the first pressure drop will vary with fluid flow rate and viscosity (a temperature dependent parameter) and that the second pressure drop will vary with flow rate only. Thus the pressure drop characteristics of the two orifices can be arranged such that the viscosity generated pressure drop of the first orifice means predominates at low fluid temperatures so that the valve is held open up to higher fluid flow rates at low temperatures , whereas at higher fluid temperatures the flow rate generated pressure drop of the second orifice predominates so that the valve closes at lower fluid flow rates at higher fluid temperatures.

Experience shows that when starting-up a diesel engine at low temperatures it is necessary for the engine to reach speeds well above its normal tickover speed of say 750 r.p.m. before the engine is capable of sustaining combustion and continuing to run. The speed which the engine must reach to sustain combustion is higher the lower the temperature. Thus at, for example, −15 degrees C. experience shows that an engine speed of say 1250 r.p.m. is required to sustain combustion whereas at −10 degrees C. a speed of say 850 r.p.m. is sufficient.

Thus applying the present invention to the unloading of an hydraulic circuit with a diesel engine driven pump, the pressure drop characteristics of the first and second orifice means are arranged to ensure that the valver closes at a flow rate (and thus an engine speed) which correspond to the engine speed required to sustain combustion in the associated diesel engine at the temperature in question. This not only ensures that the engine is relieved of the load of the hydraulic circuit until it has attained the engine speed necessary for it to sustain combustion but also ensures that once the engine is running the valve will close to ensure an immediate supply of fluid to important hydraulic functions such as steering and braking so that, for example, a tractor operator cannot drive off following a start-up and be without steering or braking.

In a preferred construction the valve comprises a housing with a stepped bore with a larger diameter bore portion containing the inlet and a smaller diameter portion containing the outlet and the outlet valve seat, the valve member being in the form of a stepped spool having a larger diameter portion including the first orifice means and slidable in the larger diameter portion of the bore and a smaller diameter portion including the valve surface and the second orifice means and slidable in the smaller diameter portion of the bore, a first inlet chamber defined between the steps in the spool and bore, a second chamber defined between the larger diameter ends of the bore and spool with the first orifice means connecting the first and second chambers, and a substantially restriction free passageway extending within the spool between the second chamber and the second orifice means.

The present invention also provides an hydraulic circuit including an engine driven pump and an unloading valve of the form described above arranged to open and thus unload the circuit at low fluid temperatures in order to facilitate start-up of the engine.

The invention further provides an hydraulic pump including an unloading valve of the form described above.

One embodiment of the present invention will now be described, by way of example only, with reference to the accompanying drawings in which.

Figure 1:
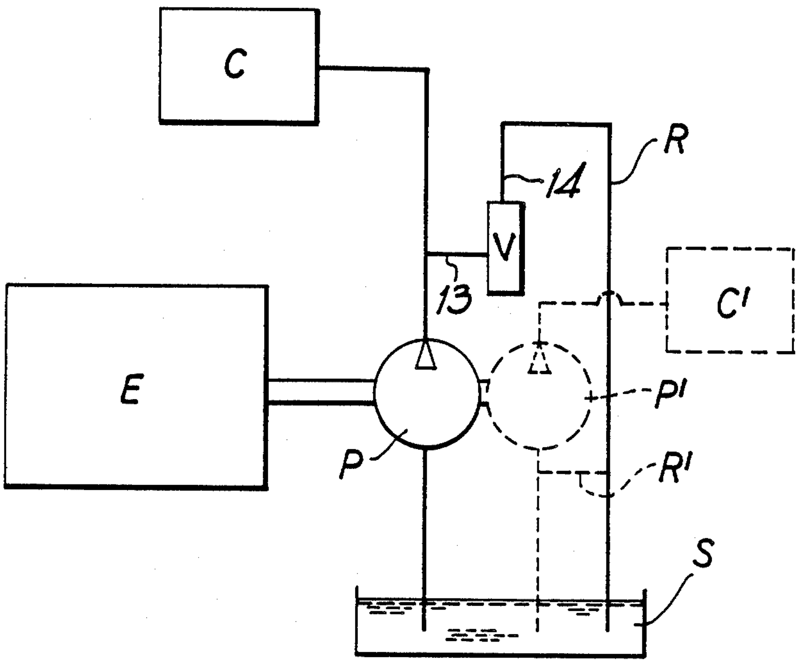
FIG. 1 is schematic view of a tractor hydraulic circuit including an unloading valve in accordance with the present invention.

Referring to FIG. 1 this shows an hydraulic circuit in which a tractor diesel engine E drives a pump P which supplies pressurised hydraulic fluid to hydraulic consumers C (which may include the tractor steering and braking circuits) from a sump S. The circuits also includes an hydraulic unloading valve V in accordance with the present invention whose characteristics are adjusted such that at low temperatures below say −10 degrees C. the unloading valve is open so that any fluid pressurised by pump P is returned to the sump S via return line R in preference to being pumped through consumers C. The characteristic of valve V ensures that at temperatures above say −8 degrees C. the valve is closed so that the pump P then supplies the consumers C in the normal manner.

As referred to above and described below, by unloading the hydraulic circuit at low temperatures, when the fluid is most viscous, the engine E will be relieved of significant extra load thus facilitating starting of the engine.

If, for example, a tandem pump arrangement is employed in which a second pump P′ is also driven from engine E to feed a second set of consumers C′, then the return in line R may be arranged to feed into the inlet side of pump P′ via line R′ instead of discharging into the sump S. Such an arrangement will reduce the suction losses associated with operating the second pump P′.

Turning now to the details of valve V which enable the above characteristic to be obtained, the valve comprises a housing 10 having a stepped internal bore with a larger diameter bore portion 11 and a smaller diameter bore portion 12. An inlet 13 opens into the larger diameter bore portion 11 and outlet 14 is provided in the end of smaller diameter portion 12. A stepped spool-type valve member 15 is slidable in the stepped bore and defines a first chamber A between the shoulder 16 of the bore and the shoulder 17 of the valve member. A second chamber B is defined between the larger diameter end of valve member 15 and the associated end of bore portion 11.

Chambers A and B are interconnected by a first orifice means in the form of two long drillings 18 which are dimensioned to ensure a substantially laminar flow of any fluid flowing from chamber A to chamber B. For example, in one design tested by the Applicant using a fluid of 15 w/30 viscosity and an effective spool area ratio for chambers A and B of 1:2 the drillings 18 were of 3.35 mm diameter and 15 mm length.

A large diameter central passageway 19 connects chamber B with a second orifice means in the form of a sharp-edged orifice 20 (of 3.0 mm diameter in the above referred to tested design) provided in a nose portion 21 of the valve member 15. A valve seat 22 is provided around outlet 14 which can be contacted by a valve surface 23 provided on the nose portion 21 of the valve member 15. A light spring 24 acts between the end of the small diameter portion 12 of the bore and the nose 21 of the valve member. This spring is simply sufficiently strong to ensure that the valve seat 22 surrounding outlet 14 is opened when there is no flow though inlet 13.

It will be appreciated that since the flow along drillings 18 is substantially laminar the pressure drop between chamber A and B will vary both with the fluid flow rate and with the viscosity of the fluid entering the inlet of the unloading valve. Thus the pressure drop across the drillings 18 is temperature dependent.

Figure 3:
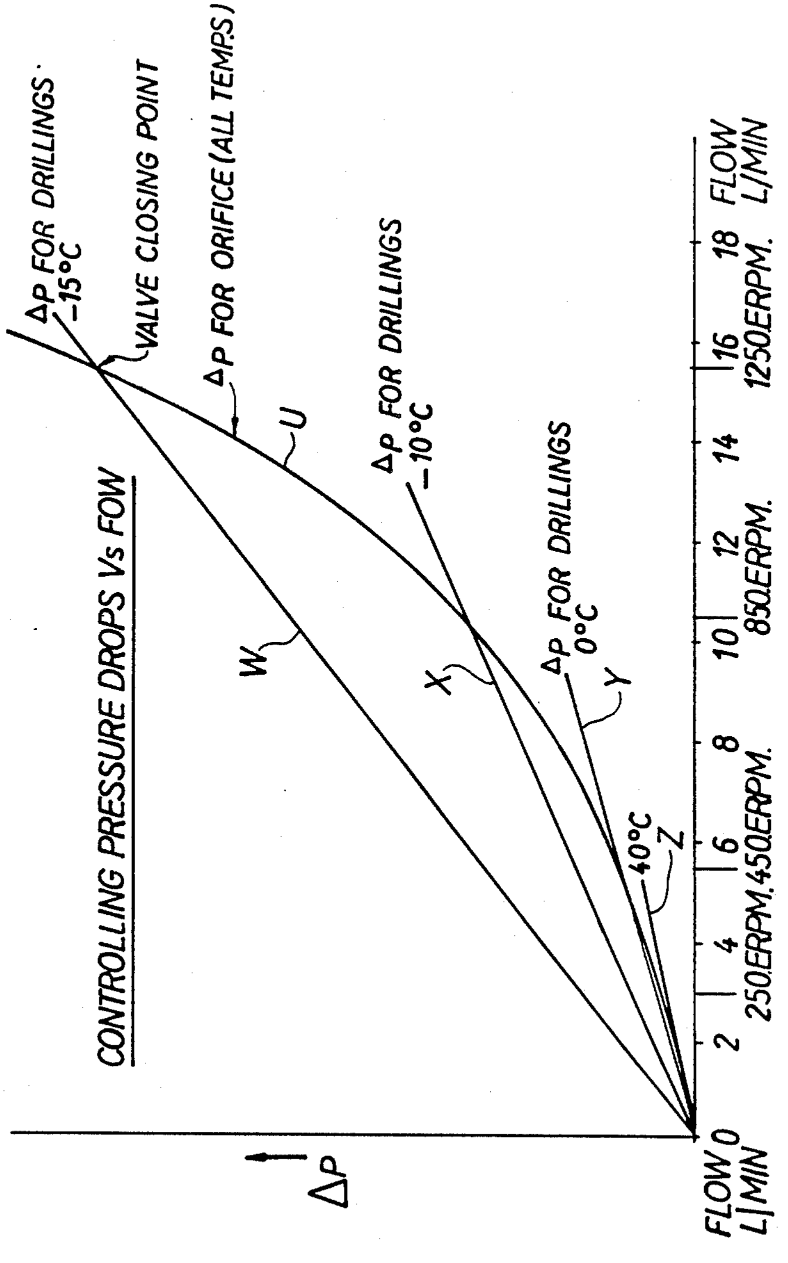
FIG. 3 is a graphical representation of typical pressure drop characteristics of the orifices used in the valve of FIG. 2, and FIGS. 4, 5 and 6, 7 show alternative forms of spool construction for use in the valve of FIG. 2.

FIG. 3 shows curves W, X, Y and Z which illustrate typical pressure drop against the flow rate characteristics of drillings 18 for the temperatures −15 degrees C., −10 degrees C., zero degrees C. and 40 degrees C. respectively. The flow rate axis of FIG. 3 is also marked with the approximate engine speed r.p.m. figures corresponding to the given flow rates.

It will be appreciated since orifice 20 is sharp edged its pressure drop is independent of viscosity and is thus not temperature dependent. A typical pressure drop against flow rate curve for the sharp edged orifice 20 is shown at U in FIG. 3.

The spool 15 is arranged so that the pressure drop across drillings 18 tends to move the spool away from the valve seat 22 whereas the pressure drop across the sharp-edged orifice 20 tends to move the spool member towards the valve seat.

Referring to FIG. 3, it will be understood that the intersection points of the curve U with the respective temperature curves X, Y Z and W indicate the flow rates necessary before the pressure drop across the sharp-edged orifice 20 will close the unloading valve.

Thus, for example, at −15 degrees C. a flow rate of 15.5 litres per minute (approximating to an engine r.p.m. figure of 1250) is required to close the valve. As indicated above, 1250 r.p.m. is the approximate engine speed necessary to ensure that combustion will be sustained and the engine will continue to run at −15 degrees C. Thus when the operator initiates the start-up of the engine at −15 degrees C. the engine throttle must be set at well above 1250 r.p.m. and initially the engine starter motor will crank the engine up to speed of say 120 r.p.m. at which speed the combustion process begins within the engine. The starter motor continues to provide useful assistance to the engine until the speed has built-up to about say 700 r.p.m. after which the engine enters a phase during which the starter can be released but the engine speed must still be allowed to continue to build with little or no external load until the engine has reached approximately 1250 r.p.m. at which speed experience has shown the combustion process is fully established and the continued running of the engine is ensured.

It will be appreciated that during the above described start-up procedure which may take many seconds, the unloading valve will remain open thus relieving the engine of most of the additional load associated with driving the pump P. Also the closing of the valve at 1250 r.p.m. ensures that the operator cannot drive away the tractor and find that he is without vital hydraulic functions such as steering and braking.

Tests have shown that the unloading valve of the present invention increases the initial cranking speed with a diesel engine at −15 degrees C. by approximately 10 r.p.m. It will be appreciated that this is a significant increase since a typical engine cranking speed is 120 r.p.m. Greater benefits are of course obtained at lower temperatures.

Similarly at −10 degrees C. the engine r.p.m. figure necessary to close the valve is adjusted to approximately 850 r.p.m. which is the engine speed necessary at this temperature to ensure continued combustion thus again ensuring that the hydraulic circuit will be unloaded during the start-up of the engine and that the valve will close at a speed approximately equal to that necessary to sustain combustion.

Reference to curve Y shows that at zero degrees C. the engine r.p.m. required to close the valve is approximately 450 r.p.m. so that the valve will close well before the engine tickover speed of 750 r.p.m. so that the valve is in effect non-operative. In fact the valve characteristics are preferably adjusted to ensure that the valve will close before the tickover speed is obtained at all temperatures above say −8 degrees C. since the viscosity effects are less significant above this temperature.

If desired the unloading valve V may conveniently be built into the body of the pump P thus providing a still further improvement in performance since the power loss associated with the piping to the valve will be reduced.

Figure 4:
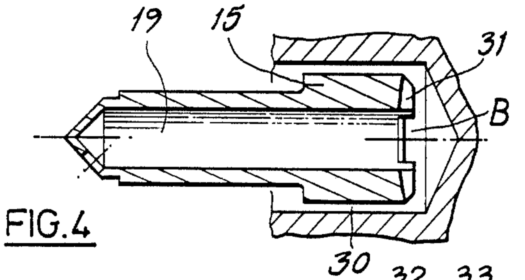
Figure 5:
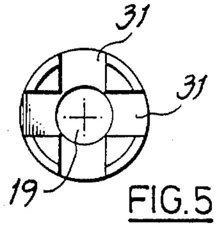

FIGS. 4 and 5 show an alternative spool arrangement in which the drillings 18 are replaced by a a large annular clearance 30 between the larger diameter end portion of the spool 15 and the corresponding bore portion in 11. The end of the spool 15 is provided with cutouts 31 to ensure flow into the central passageway 19.

Figure 6:
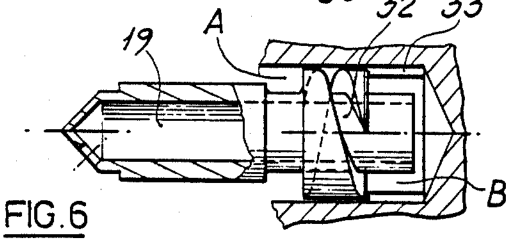
Figure 7:
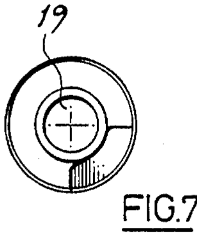

FIGS. 6 and 7 show a still further form of spool in which the drillings 18 are replaced by a spiral groove 32 which interconnects chambers A and B. A sleeve 33 is provided which abuts the end of spool 15 to ensure communication with the central passageway 19 when the spool is moved fully to the right.

Figure 2:
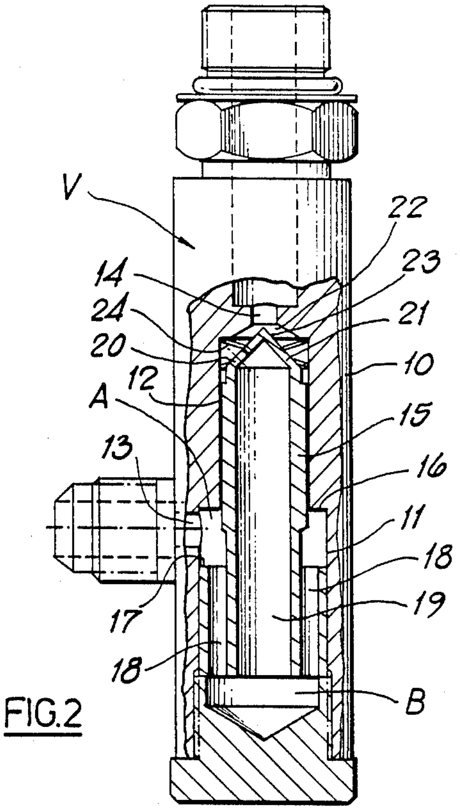
FIG. 2 is a part-sectional view through one form of unloading valve in accordance with the present invention.

Both the annular clearance 30 and the spiral groove 32 referred to above produce the same laminar flow operating effect as drillings 18 in the valve arrangement shown in FIG. 2.

I claim:

1. An hydraulic unloading valve having an inlet through which fluid enters the valve, an outlet through which fluid may leave the valve, an outlet valve seat, a valve member movable towards and away from the valve seat and carrying a valve surface for closing off the valve seat, a first orifice means sensitive to viscosity which in response to the flow of fluid through the inlet generates a first pressure drop arranged to tend to move the valve member away from the valve seat, and second orifice means which is not sensitive to viscosity and which in response to said flow generates a second pressure drop arranged to tend to move the valve toward the valve seat to bring the valve seat and surface into contact to close-off flow through the valve outlet when the second pressure drop is greater than the first pressure drop.

2. A valve according to claim 1 in which the pressure drop characteristics of the two orifices are such that the viscosity generated pressure drop predominates at low fluid temperatures so that the valve is held open up to higher fluid flow rates at low fluid temperatures whereas at higher fluid temperatures the flow rate generated pressure drop of the second orifice predominates so that the valve closes at lower fluid flow rates at higher fluid temperatures.

3. A valve according to claim 1 in which the first orifice means comprises one or more passages whose dimensions ensure substantially laminar flow of fluid therethrough and the second orifice means comprises one or more sharp edged orifices.

4. A valve according to claim 1 in which a light spring is preferably provided to ensure that the valve seat is opened when there is no inlet flow.

5. A valve according to claim 1 comprising a housing with a stepped bore with a larger diameter bore portion containing the inlet and a smaller diameter portion containing the outlet and the outlet valve seat, the valve member being in the form of a stepped spool having a larger diameter portion including the first orifice means and slidable in the larger diameter portion of the bore and a smaller diameter portion including the valve surface and the second orifice means and slidable in the smaller diameter portion of the bore, a first inlet chamber defined between the steps in the spool and bore, a second chamber defined between the larger diameter ends of the bore and spool with the first orifice means connecting the first and second chambers and a substantially restriction free passageway extending within the spool between the second chamber and the second orifice means.

6. An hydraulic circuit including an engine driven pump and an unloading valve according to claim 1 arranged to open and thus unload the circuit at low fluid temperatures in order to facilitate start-up of the engine.

7. An hydraulic pump including an unloading valve according to claim 1.

* * * * *